Figure 1:
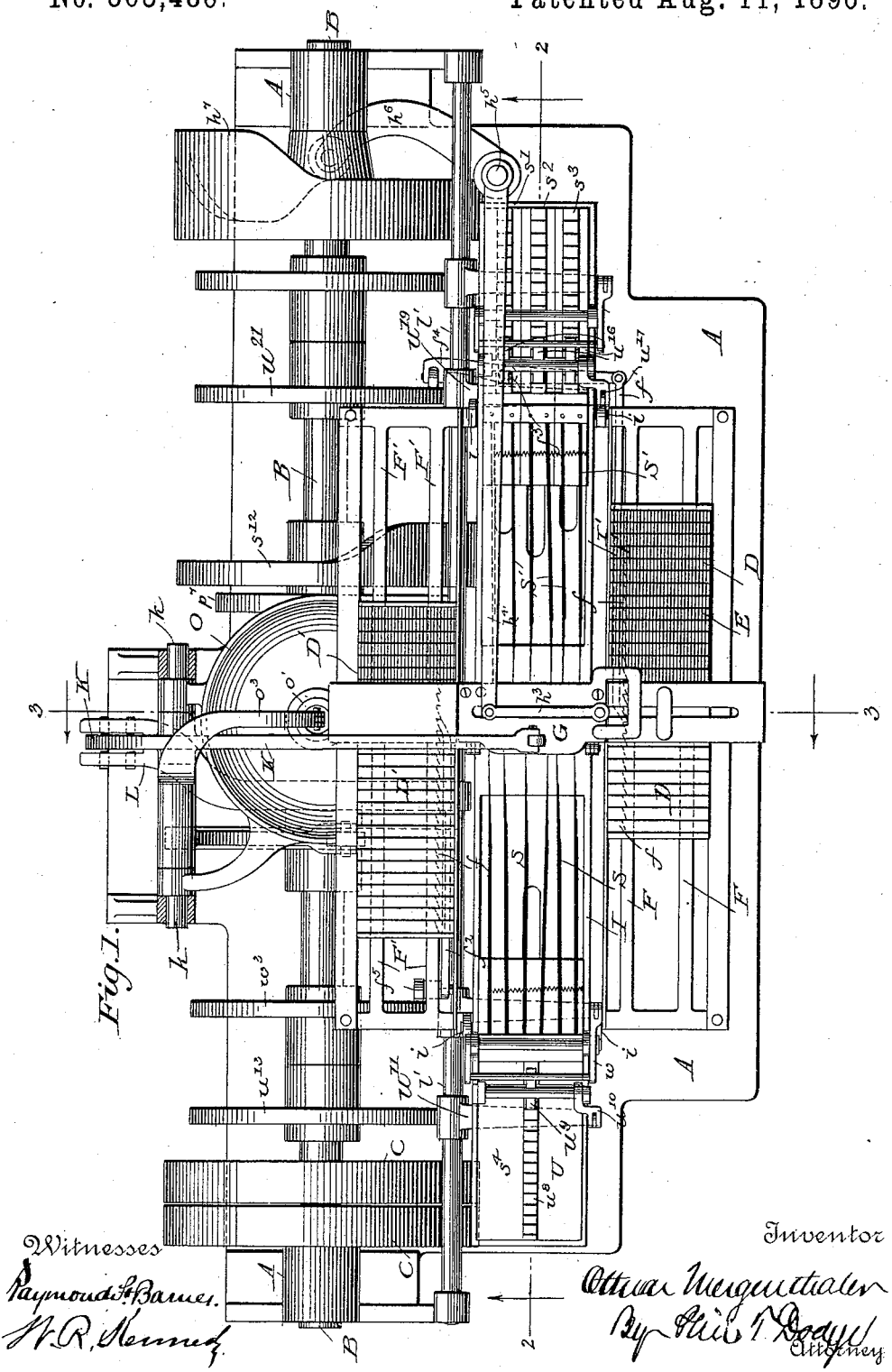

(No Model.) 8 Sheets—Sheet 1.

O. MERGENTHALER.
LINOTYPE MACHINE.

No. 565,486. Patented Aug. 11, 1896.

Witnesses
Raymond F. Barnes.
H. R. Kennedy.

Inventor
Ottmar Mergenthaler
By Philip T. Dodge
Attorney (No Model.)  8 Sheets—Sheet 3.

O. MERGENTHALER.
LINOTYPE MACHINE.

No. 565,486.  Patented Aug. 11, 1896.

on line 3—3.

Witnesses  
Inventor  
Ottmar Mergenthaler  
By Phil T. Dodge  
Attorney (No Model.) 8 Sheets—Sheet 4.
O. MERGENTHALER.
LINOTYPE MACHINE.
No. 565,486. Patented Aug. 11, 1896.
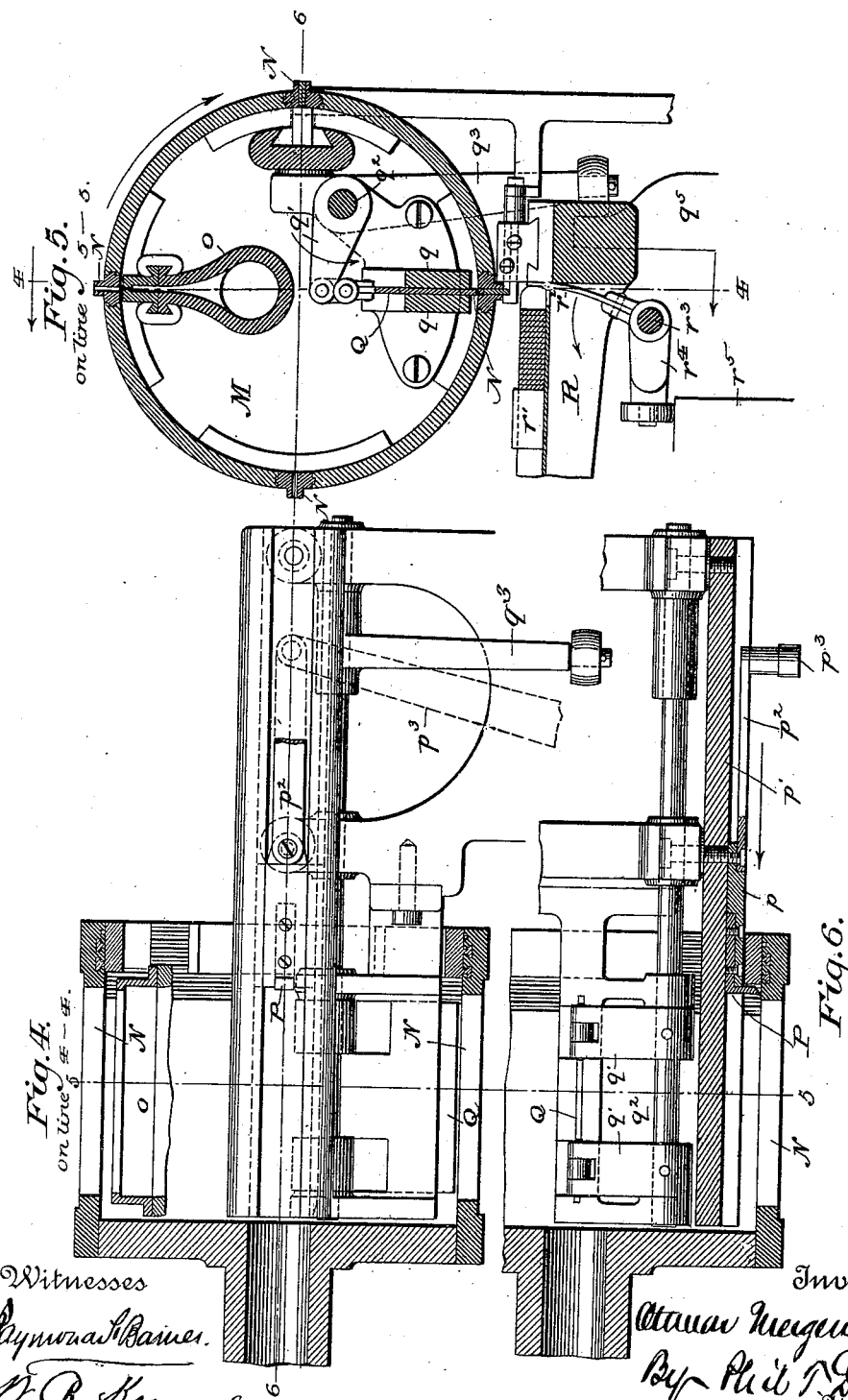

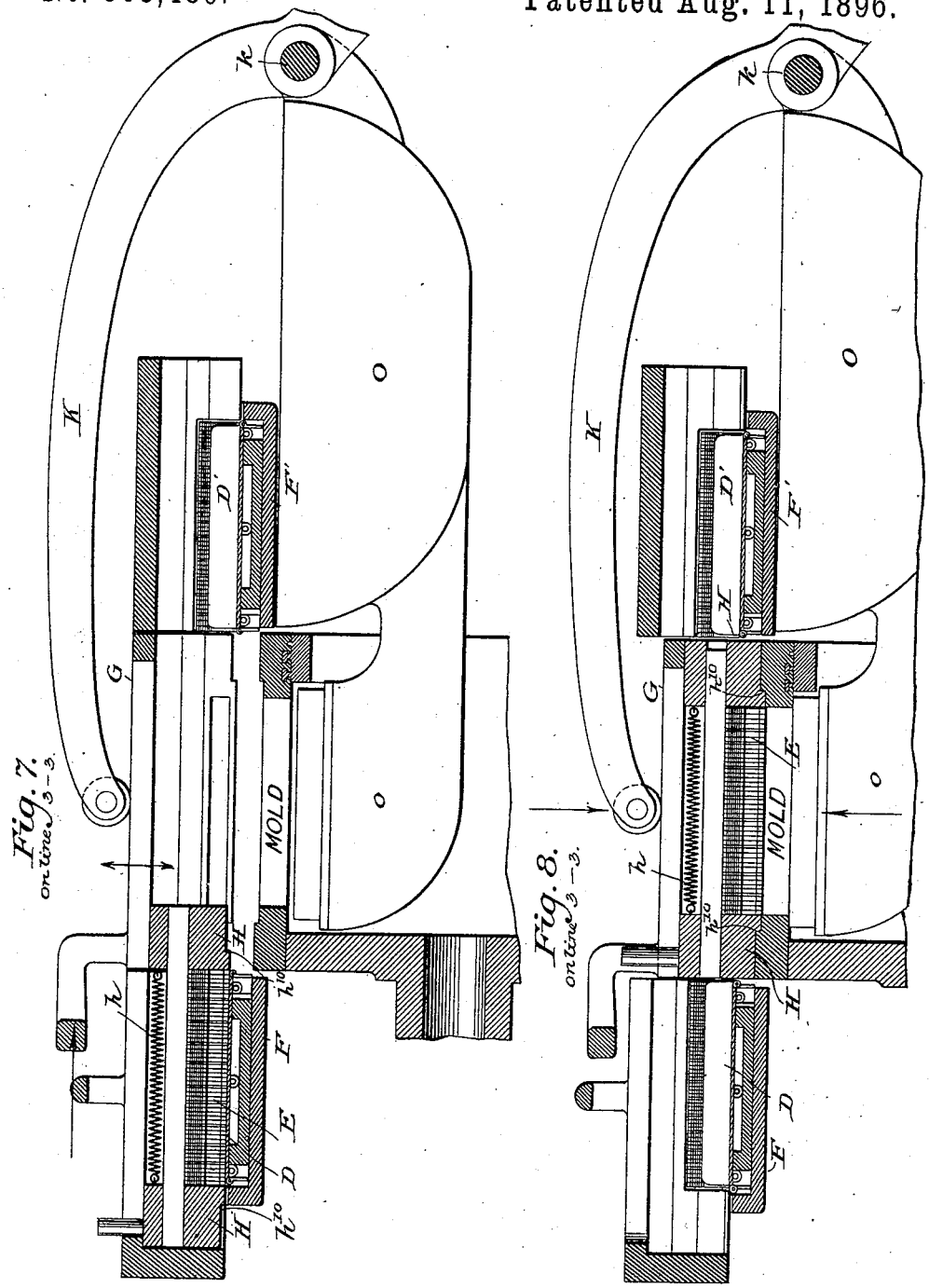

(No Model.)  O. MERGENTHALER.  8 Sheets—Sheet 6.
LINOTYPE MACHINE.
No. 565,486.  Patented Aug. 11, 1896.
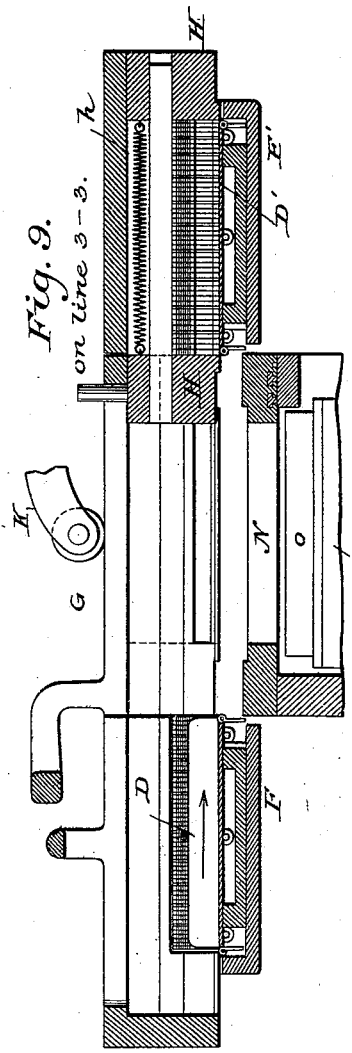
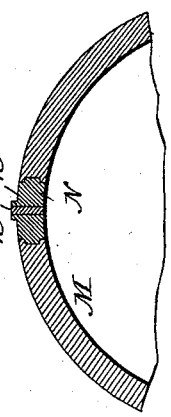
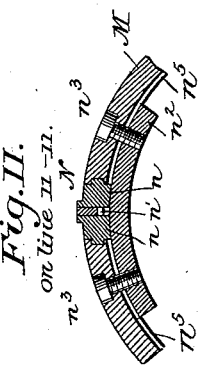
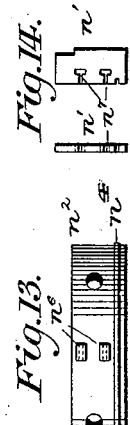
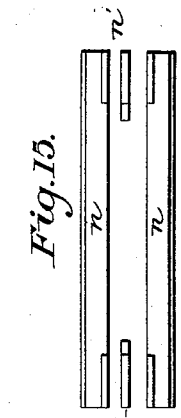
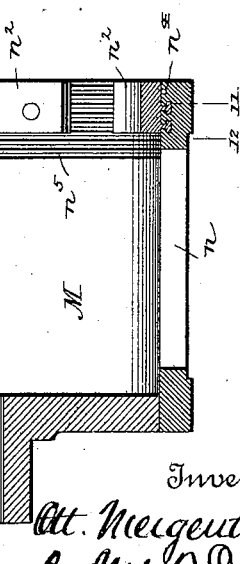

(No Model.) 8 Sheets—Sheet 7.
O. MERGENTHALER.
LINOTYPE MACHINE.
No. 565,486. Patented Aug. 11, 1896.
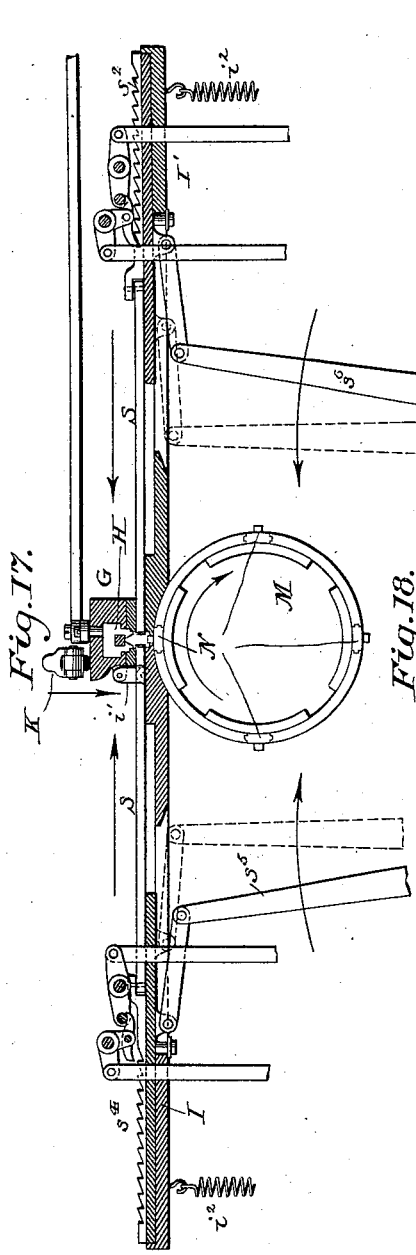
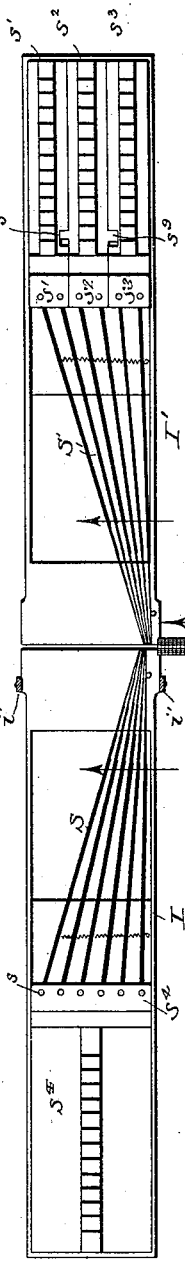
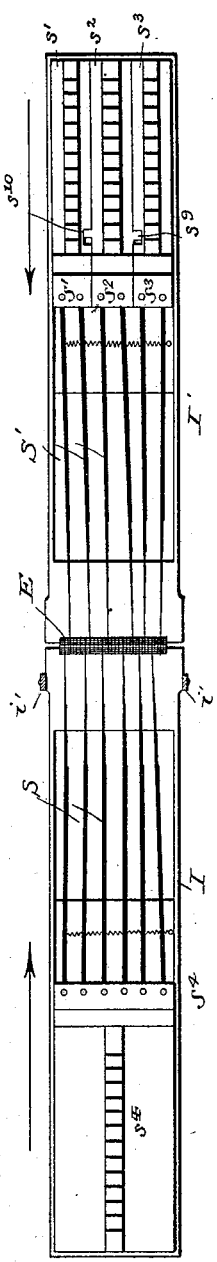
Witnesses
Raymond F. Barnes.
N. R. Kennedy
Inventor
Ottmar Mergenthaler
By Philip T. Dodge
Attorney (No Model.) 8 Sheets—Sheet 8.
O. MERGENTHALER.
LINOTYPE MACHINE.
No. 565,486. Patented Aug. 11, 1896.
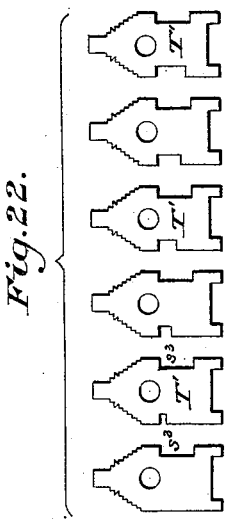
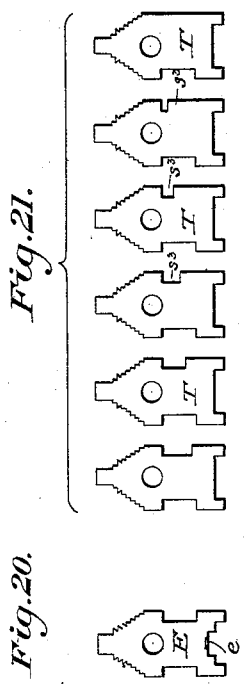
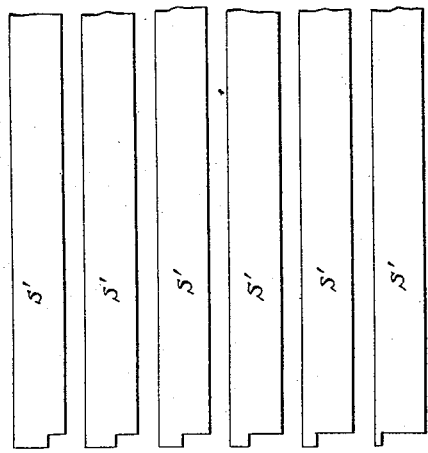
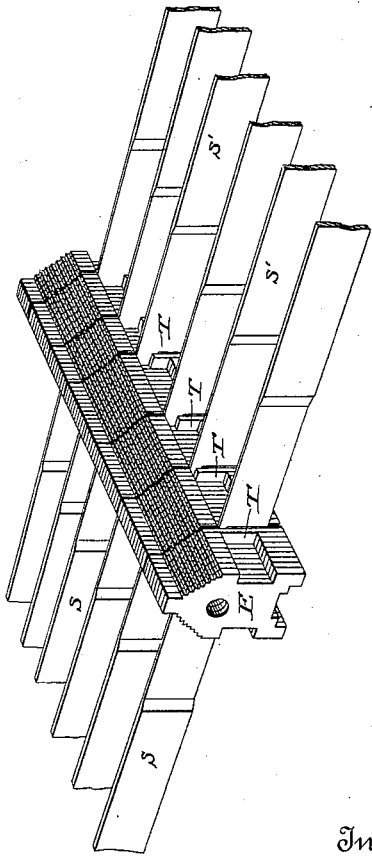
Witnesses
Raymond F. Barnes.
W. R. Kennedy
Inventor
Ottmar Mergenthaler
By Philip T. Dodge
Attorney

UNITED STATES PATENT OFFICE.

OTTMAR MERGENTHALER, OF BALTIMORE, MARYLAND, ASSIGNOR TO THE MERGENTHALER LINOTYPE COMPANY, OF NEW YORK, N. Y.

LINOTYPE-MACHINE.

SPECIFICATION forming part of Letters Patent No. 565,486, dated August 11, 1896.

Application filed July 6, 1893. Serial No. 479,752. (No model.)

*To all whom it may concern:*

Be it known that I, OTTMAR MERGENTHALER, of Baltimore, in the State of Maryland, have invented a new and useful Improvement in Linotype-Machines, of which the following is a specification.

My invention has in view the casting of linotypes or type-bars adapted for printing purposes from previously-assembled lines of matrices.

I prefer to make use of matrices, each bearing a single letter or character, and to assemble these matrices in the order in which their characters are to appear in print in a series of parallel lines without justification, or I may employ lines which have been assembled or justified in advance by a composing mechanism of any suitable character independent of the present mechanism.

In the preferred form of embodiment, as represented in the accompanying drawings, my invention embraces a machine adapted to receive a series of parallel composed lines of matrices, transfer the lines successively to the face of a mold, which is automatically supplied with molten metal, plastic material, or other suitable material, to produce the linotype, with letters in relief thereon. After the casting operation, each line of matrices is transferred to a galley or holder and is followed in regular course by the next line. Provision is made for delivering the linotypes from the mold, dressing or finishing them to the required size, and assembling them in a galley or holder.

The machine also embraces a series of justifying devices by which the successive lines are automatically justified while presented to the mold. It is to be understood, however, that this justifying mechanism in itself forms the subject of a separate application for patent, filed July 29, 1893, Serial No. 481,854, and that it may be replaced in the present organization by any equivalent mechanism which would effect the justification of the lines, or omitted if the lines are received from the composing mechanism in a justified condition.

Figure 2:
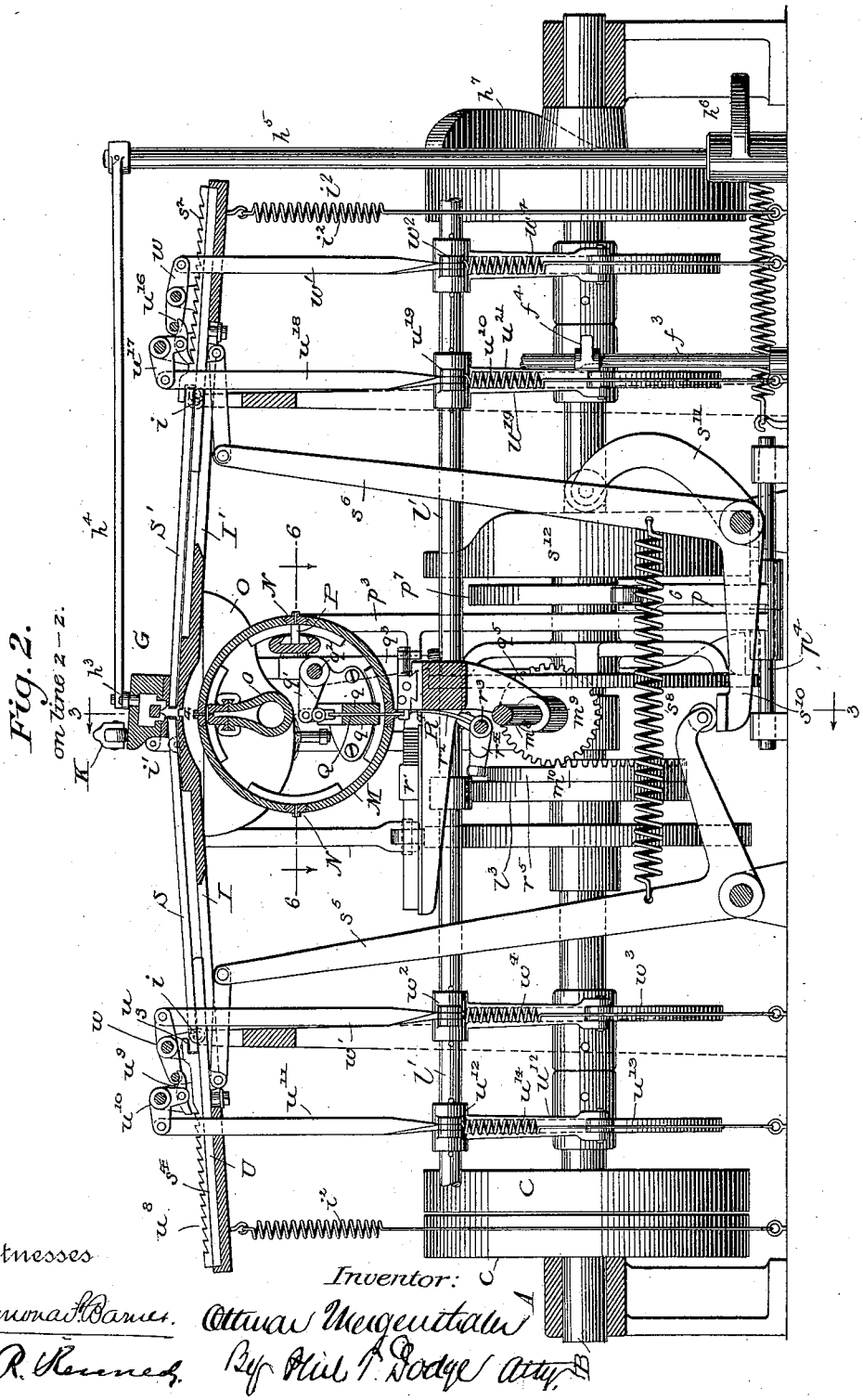
Figure 3:
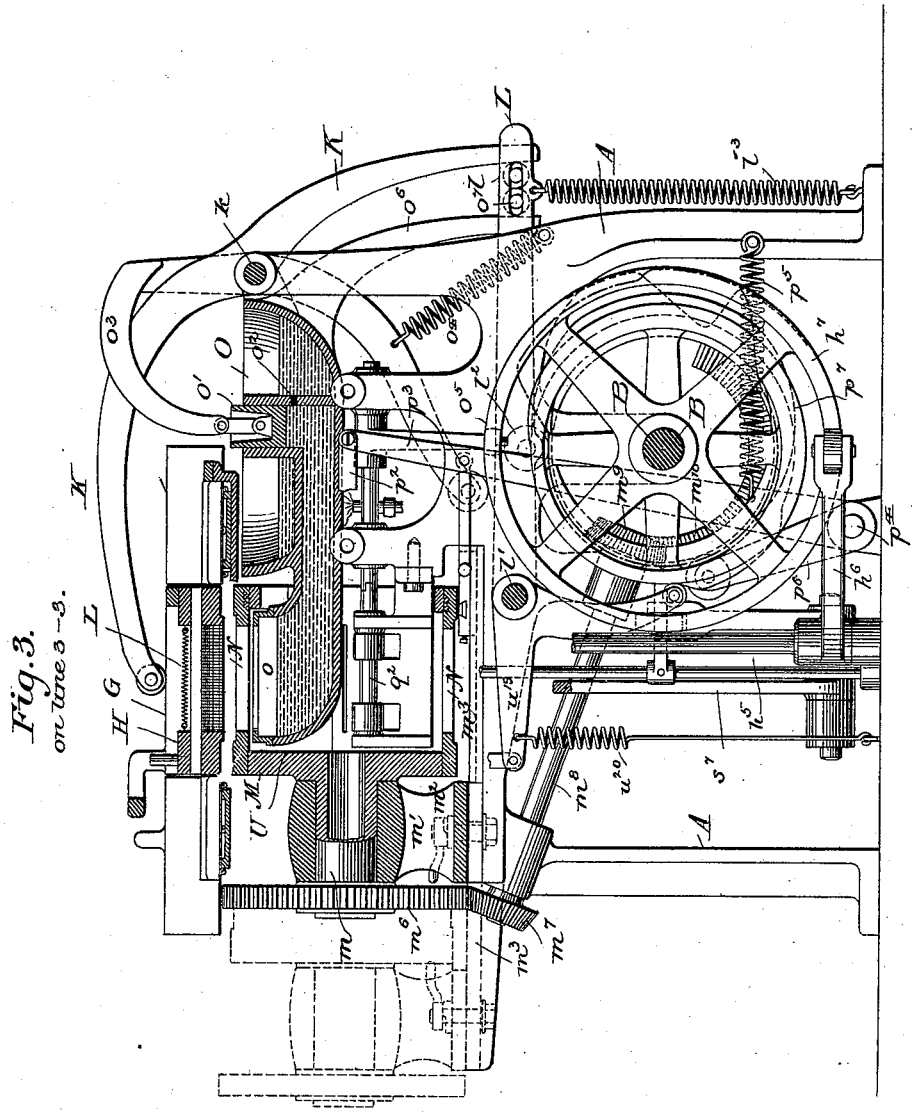

Figure 1 is a top plan view of my machine with portions broken away. Fig. 2 is a sectional elevation of the machine on the line 2 2 of Fig. 1. Fig. 3 is a vertical cross-section on the line 3 3 of Figs. 1 and 2. Fig. 4 is a vertical section through the mold on the line 4 4 of Figs. 2 and 5. Fig. 5 is a vertical cross-section on the correspondingly-numbered line of Fig. 4. Fig. 6 is a horizontal section through one side of the mold on the line 6 6 of Figs. 2, 4, and 5, looking in a downward direction. Figs. 7, 8, and 9 are vertical cross-sections through the mold and attendant parts for moving the matrices thereto and therefrom on the line 3 3 of Figs. 1 and 2, showing said parts in different positions. Fig. 10 is a vertical axial section through the mold-cylinder on the same line as Fig. 3, the internal parts being removed to expose the details of the construction. Fig. 11 is a cross-section on the line 11 11 of Fig. 10. Fig. 12 is a section on the correspondingly-numbered line of Fig. 10, showing one of the mold-liners. Fig. 13 is a view of one of the plates used to fasten and adjust a mold in the mold-cylinder. Fig. 14 represents an edge and a side view of one of the liners used to adjust the length of the line and the linotype. Fig. 15 is a face view of one of the molds proper with its parts separated to show the manner in which they are constructed and united. Fig. 16 is a transverse section through one end of the mold-cylinder on the line 16 16 of Fig. 10. Fig. 17 is a longitudinal vertical section through the upper part of the machine on the same line as Fig. 2, but with the parts in a casting position. Figs. 18 and 19 are plan views illustrating the action of the justifying devices. Fig. 20 is a side view of one of the matrices. Fig. 21 is a view showing different forms of the various space-selecting devices used in the line of matrices to determine the position of the different spaces. Fig. 22 is a similar view of a second series of space-selecting devices. Fig. 23 is a perspective view showing a line of matrices, the selecting devices therein, and the ends of the justifying or spacing plates in position for action. Fig. 24 is a view showing the shape of the ends of the various justifiers in one group or series. Fig. 25 is a perspective view of one of the galleys for carrying the lines of matrices.

A represents a rigid frame which may be of any form and construction adapted to give support to the various operative parts hereinafter described.

B is a horizontal driving-shaft mounted in bearings in the frame, and provided at one end with driving-pulleys C C, and also with various cams and gears hereinafter described, by which motion is imparted to all the leading parts of the machine.

D D' are two galleys provided with parallel grooves, each adapted to receive a composed line of type-matrices E, such as shown in Fig. 20, arranged side by side, each matrix having a single character $e$ in its lower end.

The galley D is intended to receive the lines of matrices from a suitable composing mechanism, and after being filled is applied to the present machine and arranged to slide on suitable guides or supports F. The other galley, D', is intended to receive the lines from the first-named galley after they have passed the intermediate casting mechanism, and to this end the second galley is arranged to slide on guides F' parallel with those first named.

The galleys are provided on their under sides with ratchet-teeth $f$, and are actuated, respectively, by two pawls $f'$ and $f^2$, by which they are moved, step by step, in reverse directions, so as to bring their successive grooves opposite each other, that the lines of matrices may be transferred endwise from one to the other, as will be presently explained. The pawl $f'$ is carried by an arm on the upper end of a shaft $f^3$, carrying an arm $f^4$, which acts against the cam-face on the side of one of the wheels on the main shaft. The pawl $f^2$ is actuated in a very similar manner by a lever $f^5$, actuated at its lower end by a cam on the side face of the wheel $w^3$. Both pawls are pulled backward by springs connected with their actuating-levers.

Between the two galleys is mounted a transverse guide or holder G, slotted in such manner that a line of matrices may be pushed out of one galley into position therein over the casting device, and finally transferred by a continuation of the movement from the guide into the second galley, this transfer being effected, as shown in Fig. 7, by a horizontal reciprocating carrier H, consisting of two heads drawn together by a spiral spring $h$, in order that they may confine the line of matrices between them. The action is clearly shown in Figs. 7, 8, and 9. The carrier is first moved to the left, as shown in Fig. 7, and the galley advanced endwise, so as to present the line of matrices E between the two heads of the carrier, which is then moved to the right to a position intermediate of the galleys, as shown in Fig. 8, where it remains until the completion of the casting action, after which the carrier continues its movement to the right, transferring the line of matrices to the second galley D', as shown in Fig. 9. The galley D' then advances endwise, moving the matrices out of the carrier H, which then returns to its original position at the left in order to receive another line from the first galley.

The carrier H is connected by link $h^3$ to one end of an arm $h^4$ on a vertical shaft $h^5$, seated in the main frame and provided at its lower end with an arm $h^6$, acting against the side face of a cam-wheel $h^7$ on the main shaft, as plainly shown in Figs. 1 and 2, a spring being connected with the arm $h^7$, as shown, to throw the parts in the reverse direction from that in which they are moved by the cam. In order to effect the separation of the two heads of the carrier H, the operating-link $h^3$ is connected to the one on the left, while the one on the right is engaged to encounter a stop or shoulder. When, therefore, the carrier is moved over to the left to receive a new line, the head to which the link is connected will continue its motion slightly after the other has stopped, and thus the space between the heads will be increased and the free entrance of the matrix-line between them permitted. The mechanical separation of the heads, however, is not an essential feature, as the line may be crowded between them if they are slightly rounded or beveled. When the carrier is at the right and in position to have the matrices removed by the galley D', it is not necessary to mechanically separate the heads which confine the line, as the movement of the galley will carry the matrices out of the carrier without difficulty.

The intermediate yoke or guide G overlies the inner ends of the two tables I I', located at the top of the frame, and mounted each on a transverse horizontal axis $i$, so that their inner ends may be moved upward and downward to a limited extent. The guide G is fixed to the table-section I', and connected to the section I (see Fig. 2) by a link $i'$, whereby they are caused to rise and fall in unison.

Springs $i^2$, extending downward from the outer ends of the table-sections to the main frame, give the inner ends of the sections, with the guide G thereon, a constant tendency to rise; but their depression is effected at proper times by the downward pressure of an overlying arm K, Fig. 3, mounted on a horizontal axis $k$ on the main frame, its lower end being continued downward and acted upon by the roller $l$ in one end of a lever L, which is mounted in the main frame on a shaft $l'$ and provided with a roller $l^2$, riding on the surface of cam $l^3$ on the main shaft, this lever and cam acting at the proper time to depress the upper end of lever K.

Beneath the guide G is located a hollow mold-cylinder M, Fig. 3, sustained at one end by the horizontal journal $m$, mounted in a bearing-post $m'$, which is secured by a bolt $m^2$ in a slot $m^3$ in the main frame, this arrangement permitting the mold to be moved backward and forward, away from its operative position, as indicated by dotted lines in Fig. 3, in order to give access to its various parts when they are to be adjusted. The mold-cylinder is closed and sustained at one end only, as shown in Figs. 3, 4 to 6, and 10. It is provided, at equal distances apart, with four (4) longitudinal slots $m^{10}$, (see Fig. 16,) to receive the molds proper, N, as shown in Figs. 10, 11, and 12. The cylinder thus arranged serves, it will be seen, as a carrier for four molds, which are presented successively to the casting mechanism, mechanism for shaving the base of the linotype, and mechanism for ejecting the linotype into the galley.

Each mold consists, as shown in Fig. 15, of two parallel bars or plates $n$, separated at the outer ends by intermediate plates $n'$, known as "liners," of the form shown in detail in Fig. 14. The liners at the inner ends of the molds may be secured by screws passing through the several parts or in any other suitable manner. Each mold is shouldered along its outer sides, and is inserted endwise to its place in the cylinder and confined at the open end of the cylinder by an internal plate $n^2$, held in turn at its ends by screws $n^3$, inserted through the cylinder. By tightening these screws the mold may be secured firmly in place in the cylinder. When in place, the mold presents a slot or opening of the exact dimensions of the required slug or linotype, this opening extending through radially from the outside to the inside of the cylinder, as plainly shown in Figs. 2, 3, 5, and 10. In order to permit the length of line to be varied, the liners at one end of the mold are made adjustable.

Each plate $n^2$ is provided, as shown in Figs. 10, 11, and 13, with a rib $n^4$, adapted to enter either of a series of grooves $n^5$ in the inside of the cylinder, whereby the plate is locked accurately in position and prevented from shifting sidewise. The plate is also provided with one or more projections $n^6$, adapted to enter notches $n^7$ in the liner $n'$, whereby the liner is in turn held in place.

The construction above described admits not only of each mold being varied in length, but also of the molds being readily removed and replaced by those of different size; that is to say, those adapted to produce bodies of different thicknesses.

The mold-cylinder is located immediately beneath the guide G and the inner ends of the tables, so that when said parts are depressed, as above described, the tables will fit down closely upon the upper surface of the mold and, confining the matrices between them, present the line of matrix-characters against and across the outer side of that mold, which, for the time being, is at the top of the cylinder.

For the purpose of supplying molten metal to the mold presented to the matrices I provide a melting-pot O, mounted on the horizontal shaft $k$ and having a long delivery spout or mouth $o$, which is projected within the open end of the cylinder M and adapted to close up tightly against the under side of the mold, this delivery-mouth being provided with a slit or series of openings through which metal may be delivered in an upward direction into the mold throughout its entire length at one operation. The delivery is effected by a pump-plunger $o'$, mounted in the cylinder formed in the pot and adapted to pass downward over the opening $o^2$, through which the metal enters the cylinder, this arrangement causing the piston to deliver the metal positively and forcibly into the mold and against the matrix-characters at the top, the result being the production of a linotype or slug bearing on its upper edge, in relief, all the characters represented by the matrices.

The pump-plunger is operated by a lever $o^3$, mounted on the shaft $k$, and depressed by a spring $o^4$, connected with the main frame. The elevation of the lever and plunger is effected by a cam $o^5$, mounted on the main shaft and acting against a roller in the lower end of the lever.

The pot is thrown upward and downward to and from the mold by means of an arm $o^6$, rigidly fixed to the pot and extending downward, subject to the action of the roller $o^7$ in the lever L, before mentioned. The rollers $l$ and $o^7$ for operating, respectively, the lever K and the pot-arm are situated between said members and against each other, as shown in Fig. 3, and have their journals arranged to ride in slots in the sides of the lever L. This arrangement admits of the rollers acting smoothly and with minimum friction. After each casting operation the mold-cylinder makes one-quarter of a revolution, in order to present the next mold in its turn at the casting-point, and also to carry the mold containing the linotype forward. This rotation of the mold-cylinder may be effected in any suitable manner. As shown in the drawings, the journal of the mold-cylinder is provided with a gear-wheel $m^6$, engaging a beveled pinion $m^7$ on a shaft $m^8$, mounted in the main frame and provided at the lower end with a pinion $m^9$, which receives an intermitting rotation from segmental gear $m^{10}$, formed on one of the cam-wheels on the main shaft.

In order that the linotypes may be of uniform height, I provide for dressing or cutting off their bases before they are delivered from the mold. This is effected by a knife arranged to travel lengthwise of the mold, as shown in detail in Figs. 4, 5, and 6, in which P represents the knife, adapted to a slide $p$, arranged to travel to and fro in a guiding-bracket $p'$, which is sustained on the frame and projects into the open end of the mold-cylinder. When the mold has advanced from the casting-point to a position in which it presents the base of the linotype in front of the knife, the latter advances, as indicated by the arrow in Figs. 4 and 5, traveling across the base of the linotype and planing or dressing the same down flush with the inner face of the mold, the mold determining the height of the linotype. The movement of the knife is effected by a link $p^2$, connected to a lever $p^3$, which is mounted on the rock-shaft $p^4$ in the base of the frame (see Fig. 2) and drawn backward by spring $p^5$. Its forward motion is effected by an arm $p^6$ on the shaft $p^4$, carrying a roller which travels against a cam $p^7$ on the main shaft, as shown in Fig. 2. After this linotype has thus been dressed to height, the next movement of the mold-cylinder carries the mold to the under side, where it is to be ejected. This ejection is effected, as shown in Figs. 2 and 3, by a plate Q, mounted in vertical guides $q$, and operated by an intermediate link from the arm $q'$ on rock-shaft $q^2$, this shaft being provided with arm $q^3$, having at its lower end a roller which travels against the side face of cam-wheel $q^5$ on the main shaft, the return or rising movement being effected by a spring $q^6$. The ejector rock-shaft $q^2$ is supported in bearings on the previously-mentioned arm or bracket which sustains the slide of the trimming-knife. (Clearly shown in Figs. 3, 4, 5, and 6.)

As the ejector drives the linotypes out of the successive molds in a downward direction they fall into a galley or receiver R, fixed in the main frame and provided with a sliding block or resistant $r'$, whereby the linotypes are held in an upright position as the column is advanced by a vibrating finger $r^2$, which acts against the face of each linotype as soon as it has entered the galley, the column being thus advanced step by step, in order to afford room for the entrance of the incoming linotypes. The finger $r^2$ (see Fig. 5) is mounted on a horizontal rock-shaft $r^3$, having an arm $r^4$, with a roller riding on the surface of cam $r^5$ on the main shaft, this being the same cam which carries the gear-teeth for rotating the molds.

Having now described the means by which the lines are presented to the mold, the casting effected, and the matrices and linotypes delivered, I will describe the mechanism for justifying each line of matrices as it is presented in position over the mold.

The unjustified lines will, of course, be somewhat shorter than the line of print demanded, and it is therefore necessary to increase the blank spaces in the line between the matrices in order to elongate the same, this being technically known as the "justification." This justification is effected by means of long space-bars, each increasing in thickness step by step from one end toward the other and the bar being thrown into or through the line of matrices, preferably from opposite sides, until the thickness of their portions in the line is sufficient to effect justification. Each advance of the stepped spaces will add a definite length to the line, the increase depending upon the number of spaces which chance to be used in the line. It will sometimes happen that the space remaining to be filled is not so great as that which would be added by advancing all the spaces along step by step, and consequently such advance would be impossible. It is therefore necessary to provide for a final advancement of only one or two of the spaces. To this end I have devised a mechanism by which the spaces are operated, not only in series in the first instance, but individually at the finish, as circumstances may demand.

Referring to Figs. 1, 2, 17, 18, 19, and 23, S S' represent the series of long justifying-plates, made of steel or equivalent material, each increasing in thickness step by step from the forward end rearward. In other words, each bar presents at the end a thin portion with parallel surfaces, then a thicker portion, also with parallel surfaces, and so on, step by step, for a considerable portion of its length, each section or portion being continued to the next by an intermediate inclined surface by which the matrices are spread apart step by step as the bars are advanced endwise into the line. There are two series of these justifying-bars overlying the respective tables I I', with their thinner ends presented toward each other on opposite sides of the points at which the line of matrices is introduced above the mold. The bars on the left side of the machine are all connected, as shown in the various figures, by vertical pivots $s$ to a slide $s^4$, by which they may be moved endwise. The bars S' are grouped in pairs and connected in like manner by vertical pivots to three slides $s'$, $s^2$, and $s^3$, which have a limited independent motion, for purposes hereinafter explained.

It will be perceived that when a line of matrices is brought to the casting position it will stand between the ends of the two series of spaces, so that the latter, being first turned on their vertical pivots to bring their ends to the proper position, may thereafter be advanced by the slides endwise through the line of matrices from opposite sides, so as to spread the line out to the predetermined length between the heads of carrier H, by which the length of the line is determined, the heads being in turn provided with shoulders $h^{10}$, which interlock, as shown in Fig. 8, with shoulders on the mold to limit the extension of the line. The spaces stand in the first instance in close order at one side of the table, as shown in Fig. 18. As the spaces in the succeeding line of matrices will differ in location and in number, it is necessary to provide means for quickly adjusting the ends of the required space-bars laterally to the proper points for entry into the line. This is effected by giving each of the space-bars in each group different forms at their ends, as shown in Fig. 24, the ends being shouldered or cut away so as to present tongues of different vertical widths. For use with the matrices I provide groups of selecting-plates, such as shown at T T', Figs. 21 and 22. These plates are of the same marginal form and size as the matrices, except that on one edge they are adapted to protrude beyond the line of the matrices when set in place therein, as clearly shown in Fig. 23. These plates are inserted in the lines of matrices at the points where spaces are to occur during the course of composition, or, if preferred, at any subsequent period previous to the time of justification. I commonly introduce them mechanically during the composition of the matrix-line, so that when the composed lines are received in the galley E of the present machine the selecting-plates are in place therein. Each selecting-plate has its protruding edge $s^3$ cut away in a peculiar or distinctive manner, as shown in Figs. 21 and 22, Fig. 21 representing those plates which are to operate the spaces on the left side and Fig. 22 those which are to operate the spaces on the right side.

The form of the selecting-plates at the edge is varied to correspond with the different forms of the justifier-spacers and is such that when the line of matrices containing selecting-plates at the points where spaces are to occur, that is to say, between words, is advanced endwise from the galley D to the casting position, past the inner ends of the space-bars, as shown in Fig. 18, each selecting-plate will encounter in its turn one of the spaces and carry the latter sidewise before it. As the line advances the first selecting-plate on the right will freely pass all the space-bars except the last one on that side, which will be engaged and carried forward in front of the selecting-plate. The second selecting-plate will in like manner engage the last space-bar on the left, the third selecting-plate the last remaining space-bar on the right, and so on throughout the series, each selecting-plate in its turn serving to engage and carry forward to its operative position the end of one space-bar. When, therefore, the line has completed its inward movement to the casting position, the spaces will be distributed over the table, as shown in Fig. 23, each with its end in position to enter the line alongside of a selecting-plate for the purpose of entering the line and increasing the space at that point.

The devices for adjusting the spaces are constructed as follows: The space-carrying slide on the left, $s^4$, is connected by a link to an upright lever $s^5$, and the central space-carrying slide $s^2$ on the right is connected in a like manner to a lever $s^7$, the two levers being in turn connected, as shown in Fig. 2, by a spring $s^8$, whereby they are urged inward and caused to move the slides and advance the space-bars through the line when the parts are released. The slide $s^2$ is provided on its sides (see Figs. 18 and 19) with projections $s^9$ and $s^{10}$, entering notches in the sides of the adjacent slides $s'$ and $s^3$, the arrangement being such as to permit a lost motion between the several slides, the slide $s^2$ advancing independently, then starting slide $s^3$, and finally starting slide $s'$.

The retraction of the slides and spaces at the conclusion of the casting operation is effected by providing the shaft of lever $s^6$ with an arm $s^{11}$, bearing against the side face of a cam $s^{12}$ on the main shaft and by providing the lever $s^6$ with an arm $s^{10}$, which is projected beneath a corresponding arm on the lever $s^5$. The cam $s^{12}$, acting through the arm $s^{11}$, moves the lever $s^6$ and its slide backward, and through its arm $s^{10}$ effects the backward movement of the lever $s^5$ and the slide connected thereto.

The space-carrying slide $s^4$ on the left side is provided with a ratchet-bar $u^8$, engaged by a dog $u^9$, carried by elbow-lever $u^{10}$, actuated by bar $u^{11}$, connected in its turn to bell-crank lever $u^{12}$, which is depressed by spring $u^{14}$ and elevated by cam $u^{13}$. The cam actuating the dog causes the latter to push the slide $s^4$ backward, in order to slightly withdraw the spaces after they have been advanced into the line, for a purpose which will presently appear.

The space-carrying slides on the right of the machine are each provided with a ratchet-bar, and these bars are engaged by dogs $u^{16}$, carried by arms or levers $u^{17}$, mounted on a rock-shaft, one of the levers having an arm actuated by a rod $u^{18}$, connected to a bell-crank lever $u^{19}$, which is depressed by spring $u^{20}$ and elevated at suitable intervals by cam $u^{21}$ on the main shaft. It will be observed that the ratchet-bars of these slides have their teeth in the reverse position from those of the slide on the left, so that the cam $u^{21}$ causes the dogs $u^{16}$ to advance the several slides on the right toward the matrix-line, in order to advance the spaces positively into the line a limited distance, for the reasons hereinafter explained.

In order to throw the adjusting-dog $u^9$ out of engagement with the ratchet-bar on the left-hand side, I provide, as shown in Fig. 2, a lever $w$, mounted on the main frame and acting at one end on the dog, while at the opposite end it is connected by arm $w'$ to bell-crank lever $w^2$, which is drawn downward by a spring $w^4$ and elevated at the proper times by a cam $w^3$ on the main shaft. A similar arrangement is used at the right side of the machine for throwing the dogs $u^{16}$ out of action, as will be seen on reference to Fig. 2.

The numerous levers, the axes of which are horizontal, may be mounted on a single rod or shaft extending through the main frame from one end to the other, as shown in the drawings.

The operation of justifying is as follows: Assume that the composed line of matrices has been advanced from the first or receiving galley to a position over the mold and between the heads of carrier H, that limit the length of the line, and that the ends of the several spaces required have been carried laterally by the selecting-plates and distributed along the line at points where spaces are demanded, as shown in Figs. 1 and 23. The slides carrying space-bars are all released and advanced by the spring $s^8$, causing the bars to advance through the matrix-line until it is extended to the desired length, when the bars will stop, because it is impossible for them to enter farther. The dog and ratchet on the left now retract the left slide and space-bars slightly, removing from the line any partly-entered steps or shoulders and leaving in the line only those parts which present parallel faces between the matrices. The location of the retracting-teeth $u^8$ in relation to the shoulders on the spaces and to the movement of the dog $u^9$ is such that the spaces are retracted but a slight distance and always to such positions as to leave a step or shoulder just outside of the matrix-line. As the left-hand spaces are withdrawn those on the right advance until they introduce into the line an amount equal to that vacated by the retracted bars. As the right-hand bars are divided into groups or pairs, only two bands are advanced at a time, and thus the line is lengthened by small increments. After the advancement of the space-bars by their spring $s^8$ has ceased, the partly-entered steps or sections are farther advanced for their remaining length by the right-hand dogs and ratchets, thus insuring the entrance of the active steps to such position that they will tightly fill the space between the adjacent matrices and properly cover the mold. The independently-moving spaces on the right will in nearly every instance be arrested primarily in such position as to leave steps on two bars in a partly-entered position. This will leave a thickness of about .008 of an inch to be forced into the line; but in practice it is found that the many joints in the line give it sufficient elasticity to admit of the additional thickness being entered.

The operation of the machine as a whole is as follows: The galley containing the assembled line of matrices is applied to the machine on one side, the sides of the galley being turned down in order to permit the lines of matrices to be moved endwise. An empty galley is placed in the opposite side of the machine. The melting-pot being supplied with metal, and this metal being maintained in a molten condition by gas-flame thereunder, the machine is set in motion. While the guide G and the tables are in an elevated position, the carrier H, embracing a line of matrices, as in Fig. 7, advances endwise until the line is in position over the mold, as shown in Figs. 8 and 2. The inner ends of the tables, alining the matrices between them and the guide G, are then depressed to the positions shown in Fig. 8, thereby presenting the matrix-characters in the lower ends of the matrix-body in line over and against the mouth of the mold, as plainly shown in Fig. 8.

It will be noticed that the matrices are adapted to fit over or straddle the mouth of the mold, by which they are held the more securely in alinement. At the time of or immediately after the sinking of the table, and before the parts are finally clamped thereby, the space-bars are advanced and adjusted to justify the line, after which clamping the pump-plunger is operated and the mold filled with molten metal, producing therein the linotype or slug having on the upper edge the characters and spaces represented by the overlying matrices and space-bars. The table and the guide now rise, lifting the matrices clear of the molds and linotypes, and the pot, which had previously risen at its mouth against the under side of the mold, as shown in Fig. 8, sinks to the position shown in Fig. 7. The carrier H advances and transfers the line of matrices to the second or receiving galley and then returns to its original position over the first galley, with its jaws separated to permit the introduction of another line of matrices between them by the end motion of the galley. Previous, however, to the transfer of the line of matrices last used the space-bars are withdrawn from the line. Immediately after the rising of the matrices the mold is given a fourth of a revolution, carrying the mold which contains the last-formed linotype downward past the trimming or finishing knife, which dresses off its base and brings it to the exact height required. The mold-cylinder stops for a moment, and during this stoppage the ejector-blade Q acts to drive the linotype from the preceding mold into the galley below. It will be noticed that by making use of a series of molds in one cylinder or carrier I am enabled to perform the several operations of casting one linotype, dressing another, and ejecting a third concurrently or in rapid succession. This arrangement is also advantageous in that it gives ample time for cooling off the cast before it reaches the point of delivery, so that there is no danger of the ejector-blade embedding itself in the hot metal or of the linotype adhering strongly to the mold, as it is liable to do if subjected to the pressure of the blade while in a highly-heated condition. After one galley is emptied and the other filled they are removed from the machine and replaced by others.

It is to be noted that the matrices herein shown are suspended and handled by means of the distributing-teeth at their upper ends. Instead of having these teeth on the inner walls of a notch, or in vertical walls on the outer edge, as heretofore, the present matrices are tapered and contracted in an upward direction and the distributing-teeth are located in the outer edges of this tapered portion. This is advantageous in that they may be made somewhat smaller than would otherwise be allowable and in that their tapered ends may be run through a grooved distributer and through the grooved guides herein shown.

The tapered form of the upper toothed end of the matrix is advantageous in that it permits the employment of the requisite number of distributer-teeth and at the same time permits the teeth of the matrix to fall past the horizontal teeth or ribs of the distributer or other supporting mechanism with which the matrix-teeth may be engaged. If the teeth of the matrices and the distributer were arranged in vertical lines, it would be possible to use only a limited number of teeth on the matrices and on the distributer, for the reason that one tooth of the matrix standing directly over another would necessitate the cutting away of all the teeth below its level on the distributer-bar at the point of escape. Under the present construction it is possible for an upper tooth on a falling matrix to pass by a tooth on the distributer at a lower level since the two teeth stand in different vertical planes. Another advantage lies in the fact that the teeth stand within the plane of the outer edges of the surfaces, so that in the handling of the matrices by the various mechanisms employed there is less danger of it being worn or mutilated than would otherwise be the case.

Having thus described my invention, what I claim is—

1. In a linotype-casting mechanism, a galley adapted to hold simultaneously a series of composed lines of matrices and a casting mechanism adapted to receive said lines from the galley.

2. In a linotype-casting mechanism, the combination of two galleys or holders for composed lines of matrices and an intermediate casting mechanism arranged to receive the matrices from one galley and deliver them to the other.

3. The two sliding galleys, each grooved or channeled to receive composed lines of matrices, the intermediate mold and guide and a reciprocating carrier arranged to deliver the successive lines from one galley to the guide and thence to the second galley.

4. The sliding galleys and means for advancing them step by step in combination with the intermediate rising-and-falling guide, the reciprocating matrix-carrier, the mold adjacent to the guide, and means for supplying the mold with molten metal.

5. In a linotype-casting machine, and in combination, independent matrices, a guide to hold them in line, a mold, the rising-and-falling tables, and justifying slides or bars mounted on the tables and arranged to advance through the matrix-line.

6. The movable galleys, the lifting-tables, the intermediate guide, the mold thereunder, and the melting-pot delivering into the mold, when combined for joint operation, substantially as described.

7. In combination with the traveling mold, the matrix-supporting guide movable to and from the mold substantially as described, matrices recessed in the end to embrace the mold, means for advancing the composed line of matrices endwise into the matrix-guide, and means for thereafter advancing the guide directly toward the mold.

8. The improved linotype-matrix having its upper end contracted in width in an upward direction and provided with distributing-teeth on the outer edges of this contracted portion, substantially as described.

9. The hollow cylindrical mold wheel or carrier in combination with means for presenting matrices externally thereto, means for delivering molten metal thereto from the interior and an internal ejector to discharge the slugs or linotypes.

10. The hollow cylindrical mold-carrier in combination with means for presenting the matrices externally thereto, and the melting-pot having its delivery-mouth extended within the carrier.

11. In combination with the hollow cylindrical mold-carrier, the internally-arranged knife to dress the base of the slugs or linotypes.

12. In a linotype-machine a rotary carrier, provided with a plurality of parallel molds, in combination with mechanism for presenting composed lines of matrices, mechanism for delivering molten metal, mechanism including a reciprocating cutter for trimming the slugs or linotypes while in the molds, and ejecting devices to deliver the linotypes from the molds and means for intermittingly rotating the carrier to present each mold to the said mechanisms in the order named.

13. In a linotype-casting mechanism, the combination of a hollow, cylindrical carrier provided with a plurality of molds, mechanism for presenting composed lines of matrices externally to the molds one at a time, a melting-pot and means for delivering metal therefrom internally, to the molds, and means for operating the carrier to present and raise its molds successively between the pot and the matrix-support.

14. In a linotype-machine a rotary hollow carrier, a series of molds therein, casting devices to coöperate therewith, means for moving the mold-carrier intermittingly and a movable knife arranged to dress the base of the linotypes in the successive molds and while the latter are at rest.

15. The hollow cylindrical carrier in combination with the ribbed molds seated therein and the adjustable mold-confining plates.

16. In a linotype-casting mechanism the sectional molds having adjustable liners $n'$, and the fastening-blades adapted to engage and hold the liners.

17. In a linotype-machine the combination of a mold and a movable carrier therefor, a knife mounted to reciprocate lengthwise of and against the rear face of the mold, and means for moving the knife and mold alternately.

18. In a linotype-machine the combination of the following elements: a galley or holder containing composed lines of matrices, a casting mechanism, and a mechanism for presenting the composed lines of matrices successively to the casting mechanism.

In testimony whereof I hereunto set my hand, this 30th day of March, 1893, in the presence of two attesting witnesses.

OTTMAR MERGENTHALER.

Witnesses:
   THOS. M. DOBBIN,
   WILLIAM H. BERRY.

It is hereby certified that the assignee in Letters Patent No. 565,486, granted August 11, 1896, upon the application of Ottmar Mergenthaler, of Baltimore, Maryland, for an improvement in "Linotype-Machines," should have been described and specified as *The Mergenthaler Linotype Company, of New York, N. Y., a corporation of New Jersey*, instead of "the Mergenthaler Linotype Company, of New York, N. Y.;" and that the said Letters Patent should be read with this correction therein that the same may conform to the record of the case in the Patent Office.

Signed, countersigned, and sealed this 18th day of August, A. D. 1896.

[SEAL.]
JNO. M. REYNOLDS,
*Assistant Secretary of the Interior.*

Countersigned:
S. T. FISHER,
*Acting Commissioner of Patents.*